United States Patent
Brun et al.

(10) Patent No.: US 12,522,217 B2
(45) Date of Patent: Jan. 13, 2026

(54) SYSTEM AND METHOD FOR CONTROLLING ECO MODE OVERRIDE IN A VEHICLE

(71) Applicant: Volvo Truck Corporation, Gothenburg (SE)

(72) Inventors: Arnaud Brun, Lyons (FR); Yann Quibriac, Lyons (FR); Fanette Sevenier, Courzieu (FR)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 19/087,735

(22) Filed: Mar. 24, 2025

(65) Prior Publication Data

US 2025/0313210 A1 Oct. 9, 2025

(30) Foreign Application Priority Data

Apr. 5, 2024 (EP) .................................... 24168758

(51) Int. Cl.
*B60W 30/188* (2012.01)
*B60W 10/04* (2006.01)
(Continued)

(52) U.S. Cl.
CPC .......... *B60W 30/188* (2013.01); *B60W 10/04* (2013.01); *B60W 10/10* (2013.01);
(Continued)

(58) Field of Classification Search
CPC ............. B60W 30/146; B60W 30/182; B60W 30/188; B60W 10/04; B60W 10/10;
(Continued)

(56) References Cited

U.S. PATENT DOCUMENTS 6,640,844 B1    11/2003   Beagell et al.
6,792,344 B2*   9/2004   Minowa ................ B60W 10/18
                                                   701/87

(Continued)

FOREIGN PATENT DOCUMENTS

EP    3243719 A1   11/2017
EP    3825194 A1   5/2021

(Continued)

OTHER PUBLICATIONS

Extended European Search Report for European Patent Application No. 24168758.1, mailed Sep. 16, 2024, 8 pages.

*Primary Examiner* — Edwin A Young
(74) *Attorney, Agent, or Firm* — Withrow & Terranova, PLLC

(57) ABSTRACT

Disclosed is a computer system having a processing circuitry configured to detect, using sensors of a host vehicle, a high acceleration traffic situation involving a secondary vehicle. The processing circuitry is configured to estimate a required power to handle the high acceleration traffic situation clear of the secondary vehicle within a timeframe. The processing circuitry is configured to determine the required power exceeds a current power available in an activated ECO mode of the host vehicle. The processing circuitry is configured to adapt a driving mode of the host vehicle from the ECO mode to a higher power mode providing higher propulsion power than in the ECO mode.

20 Claims, 9 Drawing Sheets

(51) Int. Cl.
*B60W 10/10* (2012.01)
*B60W 30/14* (2006.01)
*B60W 30/182* (2020.01)

(52) U.S. Cl.
CPC ........ *B60W 30/146* (2013.01); *B60W 30/182* (2013.01); *B60W 2540/10* (2013.01); *B60W 2540/20* (2013.01); *B60W 2554/4041* (2020.02); *B60W 2555/60* (2020.02)

(58) Field of Classification Search
CPC ..... B60W 2554/4041; B60W 2555/60; B60W 2540/10; B60W 2540/20
See application file for complete search history.

(56) References Cited

U.S. PATENT DOCUMENTS

| | | |
|---|---|---|
| 2014/0370413 A1 | 12/2014 | Kilmer |
| 2018/0154726 A1 | 6/2018 | Fida |
| 2018/0154727 A1 | 6/2018 | Lavoie |
| 2019/0061756 A1 | 2/2019 | Adam et al. |
| 2020/0307595 A1* | 10/2020 | Kato ................... B60W 10/30 |
| 2021/0309223 A1 | 10/2021 | Zhu |
| 2022/0297692 A1* | 9/2022 | Imanishi ......... B60W 30/18163 |

FOREIGN PATENT DOCUMENTS

| | | |
|---|---|---|
| JP | 2012192843 A | 10/2012 |
| JP | 2013109446 A | 6/2013 |
| WO | 2018192800 A1 | 10/2018 |

* cited by examiner

SYSTEM AND METHOD FOR CONTROLLING ECO MODE OVERRIDE IN A VEHICLE

PRIORITY APPLICATIONS

The present application claims priority to European Patent Application No. 24168758.1, filed on Apr. 5, 2024, and entitled "SYSTEM AND METHOD FOR CONTROLLING ECO MODE OVERRIDE IN A VEHICLE," which is incorporated herein by reference in its entirety.

TECHNICAL FIELD

The disclosure relates generally to adapting driving modes of vehicles. In particular aspects, the disclosure relates to a system and method for controlling ECO mode override in a vehicle. The disclosure can be applied to heavy-duty vehicles, such as trucks, buses, and construction equipment, among other vehicle types. The disclosure can further be applied to passenger vehicles such as cars. Although the disclosure may be described with respect to a particular vehicle, the disclosure is not restricted to any particular vehicle.

BACKGROUND

In the automotive technology, fuel efficiency and energy conservation are of high importance. Many modern vehicles are equipped with an "ECO" mode, a feature designed to minimize fuel or electricity consumption by limiting the vehicle's acceleration capabilities and, in some instances, its maximum speed. The ECO mode is beneficial for reducing environmental impact and operational costs, but can compromise vehicle performance, especially in situations where rapid acceleration or increased power is critically needed for safe maneuvering.

SUMMARY

According to a first aspect of the disclosure, there is provided a computer system comprising processing circuitry configured to: detect, using sensors of a host vehicle, a high acceleration traffic situation involving a secondary vehicle, estimate a required power to handle the high acceleration traffic situation clear of the secondary vehicle within a timeframe, determine the required power exceeds a current power available in an activated ECO mode of the vehicle, adapt a driving mode of the vehicle from the ECO mode to a higher power mode providing higher propulsion power than in the ECO mode.

The first aspect of the disclosure may seek to solve the problem of insufficient power in ECO mode when maneuvering the vehicle through critical situations. A technical benefit may include improved safety when maneuvering through critical situations that require more power than what is available in the ECO mode. A further technical advantage is that the driving mode is automatically adapted based on detections of secondary vehicles and estimations of required power in view of currently available power. In other words, the driver does not have to engage in disabling the ECO mode which likely would cause distractions.

Optionally in some examples, including in at least one preferred example, the processing circuitry may be further configured to: acquire navigation data, determine that the host vehicle is at or near a road section that requires the higher power mode, and adapt the driving mode of the vehicle from the ECO mode to the higher power mode prior to reaching the road section. A technical benefit may include that the higher power is already made available prior to reaching a road section as a proactive action. This prevents any delays for adapting the driving mode before the driving situation potentially becomes critical. In other words, the maneuvering safety is further enhanced.

Optionally in some examples, including in at least one preferred example, wherein the road section is determined to require the higher power mode based on prior collected data indicating that the road section has historically required the power mode, or based on road characteristics extractable from the navigational data. Road characteristics may include for example slopes, short insertion lanes, or other characteristics extractable from the navigational data. A technical benefit may include improved decision making by analyzing the road characteristics or historical data.

Optionally in some examples, including in at least one preferred example, the processing circuitry may be further configured to: transmit navigation data that indicates a road section that required adapting to the higher power mode to other vehicles or to a server. A technical benefit may include improved decision-making and thereby maneuvering safety for the vehicles that benefit from the transmitted data. Further, the vehicles receiving the navigation data can proactively prepare for adapting their driving modes.

Optionally in some examples, including in at least one preferred example, the processing circuitry may be further configured to: maintain the higher power mode until the vehicle has handled the high acceleration traffic situation. A technical benefit may include that the driver does not have to manually engage the ECO mode again, thereby providing for less driver distractions and improved fuel efficiency.

Optionally in some examples, including in at least one preferred example, adapting the driving mode from the ECO mode to the higher power mode may include adapting at least one of acceleration limit, speed limit, and gear shifting strategy. A technical benefit may that those adaptions are straight forward and easily accessible and has clear impact of the vehicle's performance.

Optionally in some examples, including in at least one preferred example, the processing circuitry may be further configured to: detect an activation of direction indicator lights, that the host vehicle crosses the lane markings, and a request of increased propulsion torque via an acceleration pedal, while at the same the presence of a secondary vehicle in front of the vehicle and a secondary vehicle in the blind spot are detected using the sensors of the host vehicle, and in response, adapt the driving mode of the vehicle. A technical benefit may include detection of a critical situation where increased power is required. The critical situation is here for overtaking the vehicle in front while a secondary vehicle is present just behind the host vehicle. The overtake can be made safer with more vehicle driving power available.

Optionally in some examples, including in at least one preferred example, the processing circuitry may further be configured to: acquire navigational data, determine, from the navigational data, that the vehicle is on an insertion lane with length lower than a predetermined threshold, detect that the secondary vehicle is in the adjacent lane and behind the host vehicle and closer to the host vehicle than a predetermined proximity threshold, in response, adapt the driving mode of the vehicle. A technical benefit may include detection of a critical situation where increased power is required. The critical situation is here for entry on a road, e.g., a highway, via an insertion lane while a secondary vehicle is already on the road (highway) and relatively near and behind the host vehicle. Thus, for entry on the road from the insertion lane in front of the secondary vehicle, increased available power provides for a safer entry action.

There is further provided a vehicle comprising the computer system.

According to a second aspect of the disclosure, there is provided a computer-implemented method, comprising: detecting, by a processing circuitry of a computer system, using sensors of a host vehicle, a high acceleration traffic situation involving a secondary vehicle, estimating, by the processing circuitry, a required power to handle the high acceleration traffic situation clear of the secondary vehicle within a timeframe, determining, by the processing circuitry, the required power exceeds a current power available in an activated ECO mode of the vehicle, adapting, by the processing circuitry, a driving mode of the vehicle from the ECO mode to a higher power mode providing higher propulsion power than in the ECO mode.

The second aspect of the disclosure may seek to solve the problem of insufficient power in ECO mode when maneuvering the vehicle through critical situations. A technical benefit may include improved safety when maneuvering through critical situations that require more power than what is available in the ECO mode. A further technical advantage is that the driving mode is automatically adapted based on detections of secondary vehicles and estimations of required power in view of currently available power. In other words, the driver does not have to engage in disabling the ECO mode which likely would cause distractions.

Optionally in some examples, including in at least one preferred example, wherein a road section is determined to require the higher power mode based on prior collected data indicating that the road section has historically required the power mode, or based on road characteristics extractable from the navigational data. Road characteristics may include for example slopes, short insertion lanes, or other characteristics extractable from the navigational data. A technical benefit may include improved decision making by analyzing the road characteristics or historical data.

Optionally in some examples, including in at least one preferred example, the method may further comprise: transmitting, by the processing circuitry, navigation data that indicates a road section that required adapting to the power mode to other vehicles or to a server. A technical benefit may include improved decision-making and thereby maneuvering safety for the vehicles that benefit from the transmitted data. Further, the vehicles receiving the navigation data can proactively prepare for adapting their driving modes.

Optionally in some examples, including in at least one preferred example, the method may further comprise: maintaining, by the processing circuitry, the higher power mode until the vehicle has handled the high acceleration traffic situation. A technical benefit may include that the driver does not have to manually engage the ECO mode again, thereby providing for less driver distractions and improved fuel efficiency.

Optionally in some examples, including in at least one preferred example, wherein adapting the driving mode from the ECO mode to the higher power mode includes adapting at least one of acceleration limit, speed limit, and gear shifting strategy. A technical benefit may be that those adaptions are straight forward and easily accessible and has clear impact of the vehicle's performance.

Optionally in some examples, including in at least one preferred example, the method may further comprise: providing, by the processing circuitry, a message on a user interface in the vehicle that ECO is temporarily deactivated. A technical benefit may include increased driver awareness. Thus, the driver is explicitly informed that the ECO mode is no longer activated, and that more propulsion power is now available. That the driver is aware of that more power is influences the driver behavior during the critical situation to take better and safer decisions.

Optionally in some examples, including in at least one preferred example, the method may further comprise: detecting, by the processing circuitry, an activation of direction indicator lights, that the host vehicle crosses the lane markings, and a request of increased propulsion torque via an acceleration pedal, while at the same the presence of a secondary vehicle in front of the vehicle and a secondary vehicle in the blind spot are detected using the sensors of the host vehicle, and in response, adapting, by the processing circuitry, the driving mode of the vehicle. A technical benefit may include detection of a critical situation where increased power is required. The critical situation is here for overtaking the vehicle in front while a secondary vehicle is present just behind the host vehicle. The overtake can be made safer with more vehicle driving power available.

Optionally in some examples, including in at least one preferred example, the method may further comprise: acquiring, by the processing circuitry, navigational data, determining, by the processing circuitry, from the navigational data, that the vehicle is on an insertion lane with length lower than a predetermined threshold, detecting, by the processing circuitry, that the secondary vehicle is in the adjacent lane and behind the host vehicle and closer to the host vehicle than a predetermined proximity threshold, in response, adapting, by the processing circuitry, the driving mode of the host vehicle. A technical benefit may include detection of a critical situation where increased power is required. The critical situation is here for entry on a road, e.g., a highway, via an insertion lane while a secondary vehicle is already on the road (highway) and relatively near and behind the host vehicle. Thus, for entry on the road from the insertion lane in front of the secondary vehicle, increased available power provides for a safer entry action.

There is further provided a computer program product comprising program code for performing, when executed by the processing circuitry, the method of any example of the second aspect.

There is further provided a non-transitory computer-readable storage medium comprising instructions, which when executed by the processing circuitry, cause the processing circuitry to perform the method of any example of the second aspect.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

In the automotive technology, fuel efficiency and energy conservation are of high importance. Many modern vehicles are equipped with an "Eco" mode-a feature designed to minimize fuel or electricity consumption by limiting the vehicle's acceleration capabilities and, in some instances, its maximum speed. However, in some driving scenarios, the ECO mode with its reduced power output may cause a safety issue. For example, overtaking a vehicle or entry onto highways on short insertion lanes with insufficient available driving power can lead to a hazardous situation. Examples of the present disclosure aim to address these issues by an automated adaption of driving modes.

Figure 1:
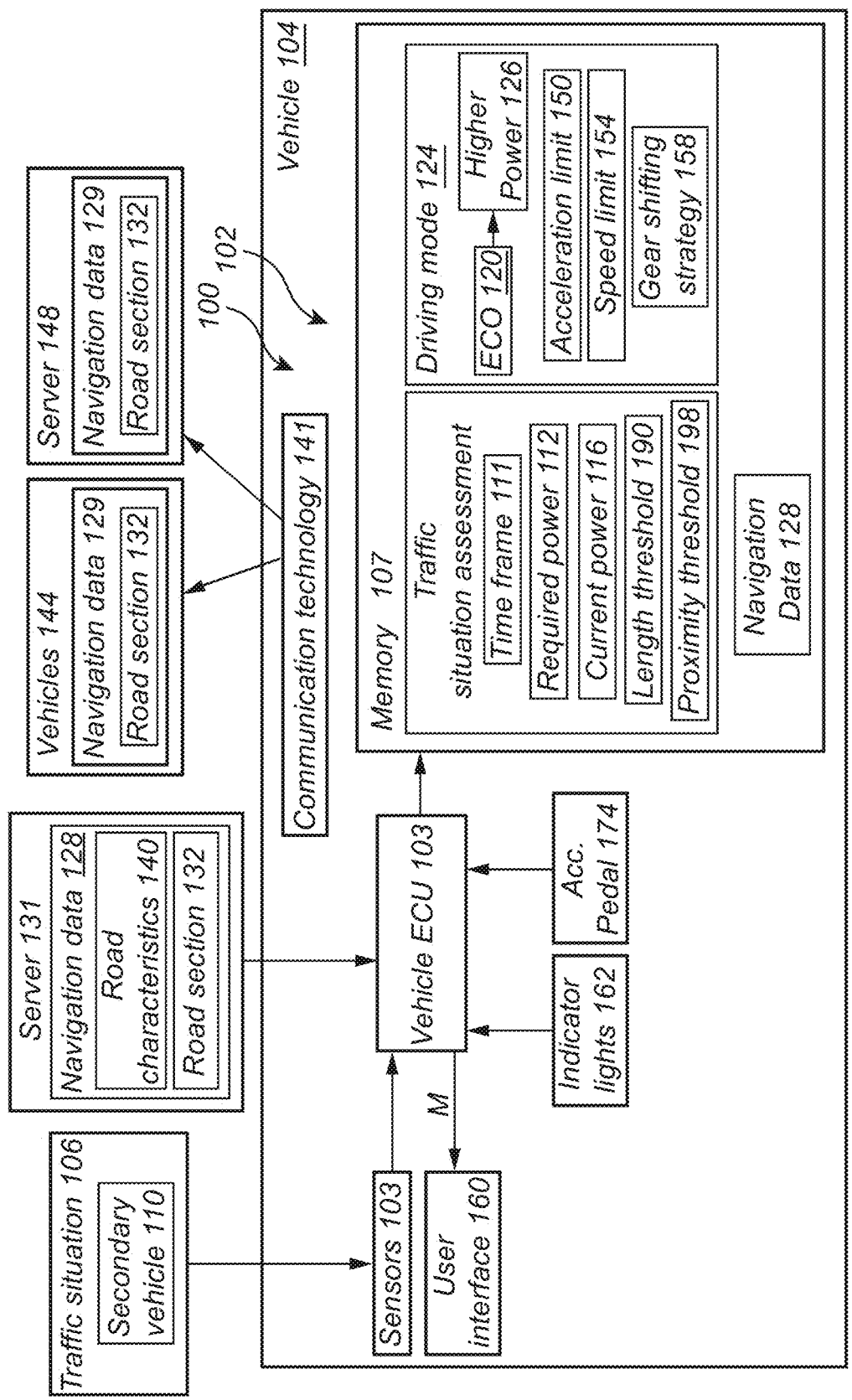
FIG. 1 is an exemplary system diagram of a computer system for automated adaptation of vehicle driving modes according to an example.

FIG. 1 is an exemplary system diagram of a computer system 100 for automated adaptation of vehicle driving modes according to an example. The computer system 100 comprises a processing circuitry 102 configured to perform various steps and actions described herein.

Computer system 100 includes processing circuitry 102 which may include a computing device 103 (may also be referred to as an Electronic Computing Unit (ECU) and memory 107 within a vehicle 104. Vehicle 104 includes sensors 103 that are configured to detect the surrounding environment, such as secondary vehicles driving in adjacent lanes or in the same lane as the host vehicle 104. The sensors 103 may include radar devices, cameras, and/or LIDAR.

Sensors 103 are used to detect a high acceleration traffic situation 106 involving a secondary vehicle 110. A high acceleration traffic situation 106 is when the host vehicle 104 benefits, from a safety perspective, in rapid acceleration to handle the high acceleration traffic situation. For example, one or more secondary vehicles 110 may travel at a speed that exceeds the speed of the host vehicle 104 in a traffic situation that requires that the host vehicle travels at a higher speed than the secondary vehicles. In such situation, being one example of a high acceleration traffic situation 106, a raid increase in acceleration of the host vehicle is needed for the host vehicle to increase its speed to handle the high acceleration traffic situation 106 in a safe way. As a further example, a high acceleration traffic situation 106 may be that the host vehicle 104 requires a speed faster than the secondary vehicle 110, and to achieve this increase within a given timeframe, a rapid acceleration is required.

The ECU 103 estimates a required power 112 to handle the high acceleration traffic situation 106 clear of the secondary vehicle 110 within a timeframe 111. The timeframe 111 is the required time to safely drive through, or handle, or overcome the high acceleration traffic situation 106. The timeframe 111 can be estimated based on measurements, using the sensors 103, and/or secondary vehicle 110 speed relative to the host vehicle 104 speed. Based on the driving action required to handle the high acceleration traffic situation 106, the speed of the secondary vehicles 110, and/or the speed of the host vehicle 104, a timeframe 111 can be estimated. Notably, the timeframe 111 is used for determining the required power 112 to handle the high acceleration traffic situation 106.

In the ECO mode 120, the vehicle 104 has access to a limited amount of current power 116 which limits the acceleration performance of the vehicle 104. In the ECO mode 120, the fuel consumption is prioritized to be kept low. However, the vehicle 104 has access to more than one driving mode 124, such as at least one higher power driving mode 126. The higher power mode 126 provides higher propulsion power than in the ECO mode. Adapting the driving modes, that is shifting between modes includes at least one of adapting an acceleration limit 150, or a speed limit 154, and/or a gear shifting strategy 158 of the host vehicle 104.

The ECU 103 determines that the required power 112 exceeds a current power 116 available in the activated ECO mode 120 of the vehicle 104. That is, more power that what is available in the ECO mode 120, is required to handle the high acceleration traffic situation 106.

The ECU 103 adapts the driving mode 124 of the vehicle 104 from the ECO mode 120 to a higher power mode 126 providing higher propulsion power than in the ECO mode 120.

The ECU 103 can acquire navigation data 128 such as GPS-data or map data. The navigation data 128 provides insights in the present location of the vehicle 104 but also the characteristics 140 of the road section ahead of the vehicle 104. For example, the navigation data 128 can provide valuable information concerning length of a road section, type of road surface, e.g., gravel, asphalt, concrete, etc., width of the road section, whether there are adjacent lanes, curvature of the road section. The navigation data 128 provides information that affect the ability for safe maneuvering of the vehicle 104, especially when handling a high acceleration traffic situation 106.

The ECU 103 is configured to, based on the navigation data 128 received from sever 131 using communication technology 141, determine that the host vehicle 104 is at or near a road section 132 that requires the higher power mode 126. In other words, the ECU 103 compares a present position of the vehicle to the location of the road section 132 and determines that the vehicle 104 is at or is approaching the road section 132. In response to concluding that the host vehicle 104 is at or near a road section 132, the processing circuitry, adapts the driving mode 124 of the vehicle from the ECO mode 120 to the higher power mode 126 prior to reaching the road section 132. That is, in this example, the adaption of the driving mode is proactively performed.

Once an adaption of driving mode 124 is made, the ECU 103 can record navigation data 128 indicating the road section 132 that required the higher power mode 126. In this way, the ECU 103 can build statistics of road sections that historically has required the higher power mode 126. In this example, in response to concluding that the host vehicle 104 is at or near a road section 132 which historically has required the higher power mode 126, the ECU 103 adapts the driving mode 124 of the vehicle from the ECO mode 120 to the higher power mode 126 prior to reaching the road section 132.

The vehicle 104 comprises a wireless communication technology 141, such a Wi-Fi, vehicle-to-vehicle (V2V), vehicle-to-infrastructure (V2I), and/or so-called cellular vehicle-to-everything (V2X). The communication technology 141 is configured to communicate with other vehicles 144 and/or with a server 148. To assist other vehicles 144 in preparing for upcoming road sections 132 that may require adapting their driving modes 124, the ECU 103 of the vehicle 104 can transmit navigation data 129 that indicates the road section 132 that required adapting to the higher power mode to other vehicles 144 or to a server 148. The navigational data 129 may be a subset of the historical data 136, or the entire set of historical data 136 is transmitted to the other vehicles 144 or to the server 148. Transmitting the navigational data to a server 148, that is accessible to the vehicles 144, 104, allows for building a statistical model of where road sections 132 are located that may require driving mode adaption, thereby improving the decision making for adapting the driving mode 124.

The ECU 103 may continuously monitor the surroundings and assess whether or not the high acceleration traffic situation 106 is handled. As long as the high acceleration traffic situation 106 is still present, the ECU 103 maintains the higher power mode 126. However, once the high acceleration traffic situation 106 is handled, the processing circuit 102 again adapts the driving mode 124, but now back to the more fuel/energy efficient ECO mode 120.

The ECU 103 can further adapt the driving mode 124 based on detecting that indicator lights 162 of the host vehicle 104 are activated and/or that a request of increased propulsion torque via an acceleration pedal 174 is made.

The ECU 103 has access to thresholds which are used in some high acceleration traffic situations 106. For example, in case of a high acceleration traffic situation 106 involving the host vehicle traveling on an insertion lane, there is a length threshold 190 below which the insertion lane is considered short.

Furthermore, in high acceleration traffic situation 106 involving a secondary vehicle 110 in an adjacent lane and behind the host vehicle 104, a proximity threshold 198 may be used below which the secondary vehicle is considered close to the host vehicle given that the host vehicle 104 is in a high acceleration traffic situation 106.

The ECU 103 may provide a message M to a user interface 160 in the vehicle 104 that ECO mode 120 is temporarily deactivated. The user interface 160 may for example be a display in the vehicle 104.

Figure 2A:
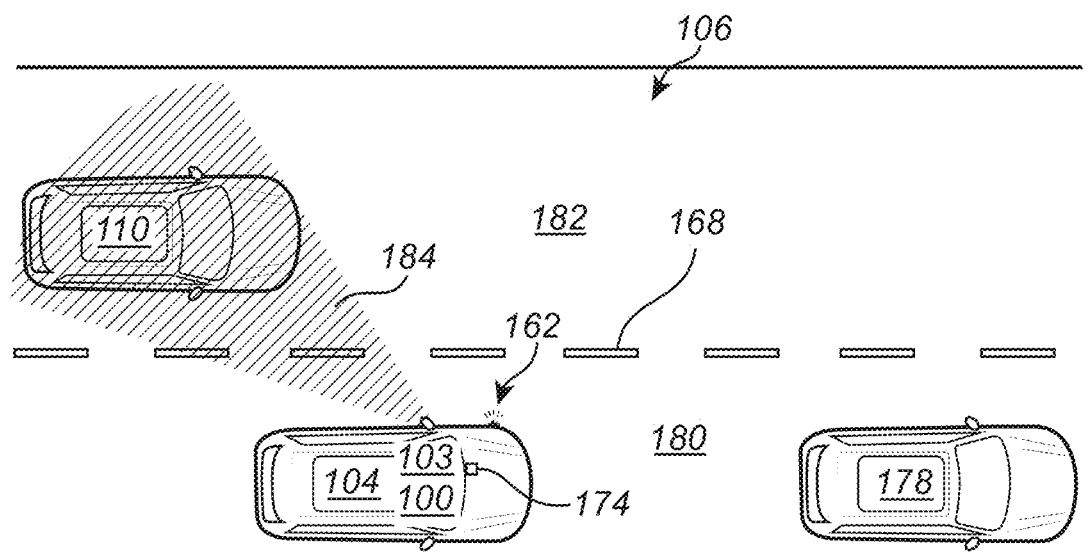
FIG. 2A illustrates an example of a high acceleration traffic situation involving secondary vehicles according to an example.

FIG. 2A illustrates an example of a specific high acceleration traffic situation 106 involving secondary vehicles 110 and 178. Vehicle 104 is the host vehicle comprising the computer system 100, indicator lights 162, and acceleration pedal 174.

In this traffic situation 106, there is a secondary vehicle 178 in the same lane 180 as and in front of the host vehicle 104, and a secondary vehicle 110 in the blind spot 182 in the adjacent lane 182. The lanes 180 and 182 are separated by lane markings 168.

The host vehicle 104 may initiate an overtake of the secondary vehicle 178 in front. The host vehicle 104 detects that activated indicator lights 162 which indicate that the host vehicle intends to move into the adjacent lane 182. As the host vehicle 104 initiates the overtake, sensors 103 of the host vehicle detect that the host vehicle 104 has crossed or is about to cross lane markings 168. The sensors XX detect secondary vehicle 178 in front of the host vehicle 104 and in the blind spot 184 of the host vehicle 104, the host vehicle 104 adapts the driving mode 124 of the host vehicle 104 to allow for higher available power to handle the high acceleration traffic situation 106.

Figure 2B:
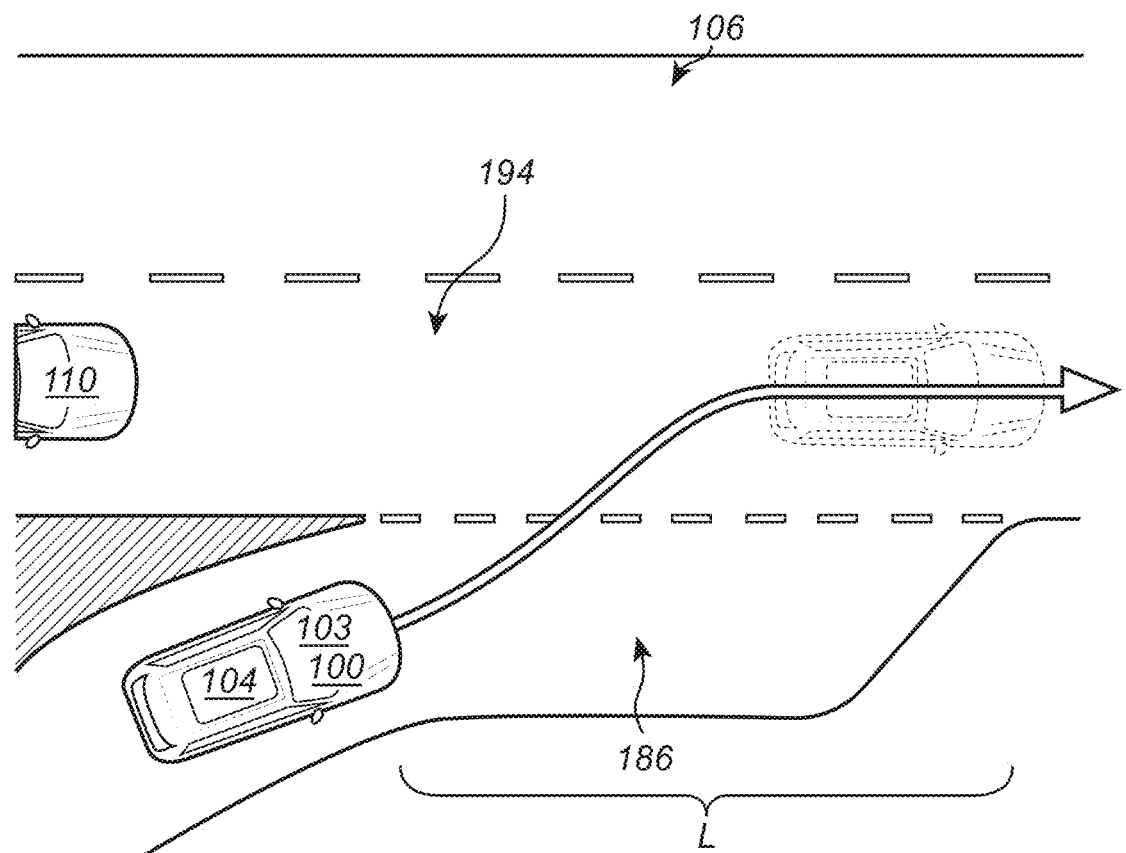
FIG. 2B illustrates an example of a high acceleration traffic situation involving a secondary vehicle according to an example.

FIG. 2B illustrates an example of a specific high acceleration traffic situation 106 involving a secondary vehicle 110. In this example, the host vehicle 104 is on, or near, an insertion lane 186 to an adjacent lane 194 for example of a highway.

The host vehicle 104 acquires navigational data 128 used to determine that the host vehicle 104 is in an insertion lane 186 with length L lower than a predetermined threshold 190. In addition, using the sensors 103, the ECU 103 of the host vehicle 104 detects that the secondary vehicle 110 is in the adjacent lane 194 behind the host vehicle 104 and closer to the host vehicle than a predetermined proximity threshold 198. For the host vehicle 104 to safely enter the adjacent lane 194 from this short insertion lane 186 with the secondary vehicle 110 approaching from behind, the host vehicle adapts the driving mode 124 of the host vehicle 104 to allow for higher available power XX to handle the high acceleration traffic situation 106.

Figure 3:
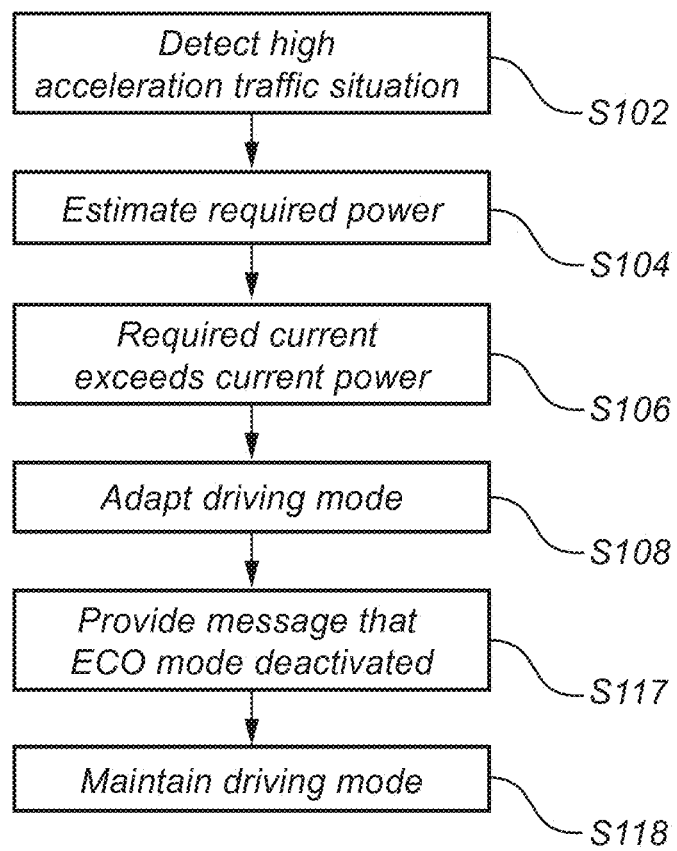
FIG. 3 is a flow-chart of a method to adapt a driving mode of a vehicle according to an example.

FIG. 3 is a flow-chart of a method to adapt a driving mode 124 of a vehicle 104 according to an example. In step S102, the host vehicle 104 detects using sensors 103 of a host vehicle 104, a high acceleration traffic situation 106 involving a secondary vehicle 110.

In step S104, the host vehicle 104 estimates a required power 112 to handle the high acceleration traffic situation 106 clear of the secondary vehicle 110 within a timeframe 111.

In step S106, the host vehicle 104 determines the required power 112 exceeds a current power 116 available in an activated ECO mode 120 of the vehicle 104.

In step S108, adapting, by the ECU 103, a driving mode 124 of the vehicle from the ECO mode 120 to a higher power mode 126 providing higher propulsion power than in the ECO mode 120.

In step S118, the ECU 103 sends a message M to a user interface 160 in the vehicle 104 that ECO mode 120 is temporarily deactivated.

When the driving mode 124 is adapted in step S108, the ECU 103 maintains, in step S117 the higher power mode 126 until the host vehicle 104 has handled the high acceleration traffic situation 106. In other words, to allow for the host vehicle 104 to safely manoeuvre the high acceleration traffic situation 106, the higher power mode 126 is activated throughout the high acceleration traffic situation 106, until the ECU 103 determines that the high acceleration traffic situation 106 is handled.

Figure 4:
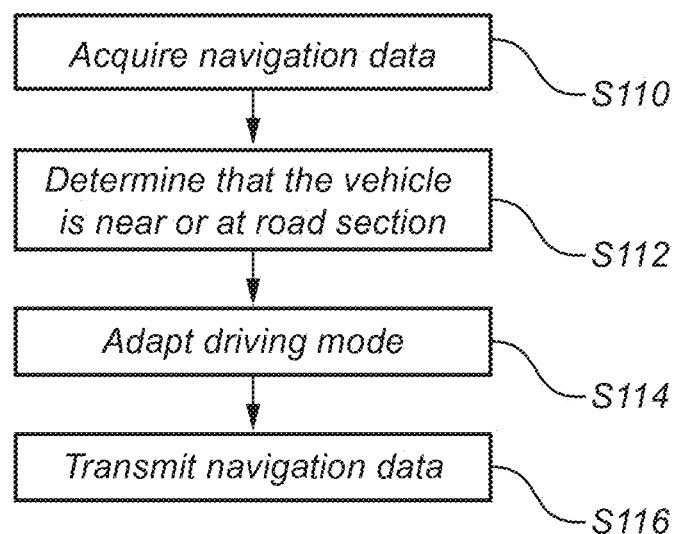
FIG. 4 is a flow-chart of method steps to adapt a driving mode of a vehicle according to an example.

FIG. 4 is a flow-chart of additional method steps to adapt a driving mode 124 of a host vehicle 104 according to an example. The steps of the method in FIG. 4 may be performed prior to the steps of FIG. 3, whereby the steps of FIG. 3 either confirms the high acceleration traffic situation 106 by detecting secondary vehicles 110 or refutes the high acceleration traffic situation 106 whereby the ECO mode 120 is again activated.

In step S110, acquiring, by the ECU 103, navigation data 128 from server 131 using the communication technology 141.

In step S112, determining, by the ECU 103, from the navigation data 128 that the host vehicle 104 is at or near a road section 132 that requires the higher power mode 126.

In step S114 adapting, by the ECU 103, the driving mode 124 of the host vehicle 104 from the ECO mode 120 to the higher power mode 126 prior to reaching the road section 132.

Once at the road section 132, the steps of FIG. 4 can confirm the high acceleration traffic situation 106 by detecting secondary vehicles 110, and maintain the higher power mode 126, or in case there is not a high acceleration traffic situation 106, the ECO mode 120 is again activated.

In step S116, transmitting, by the ECU 103, navigation data 129 that indicates a road section 132 that required adapting to the higher power mode 126 to other vehicles 144 or to a server 148.

Figure 5:
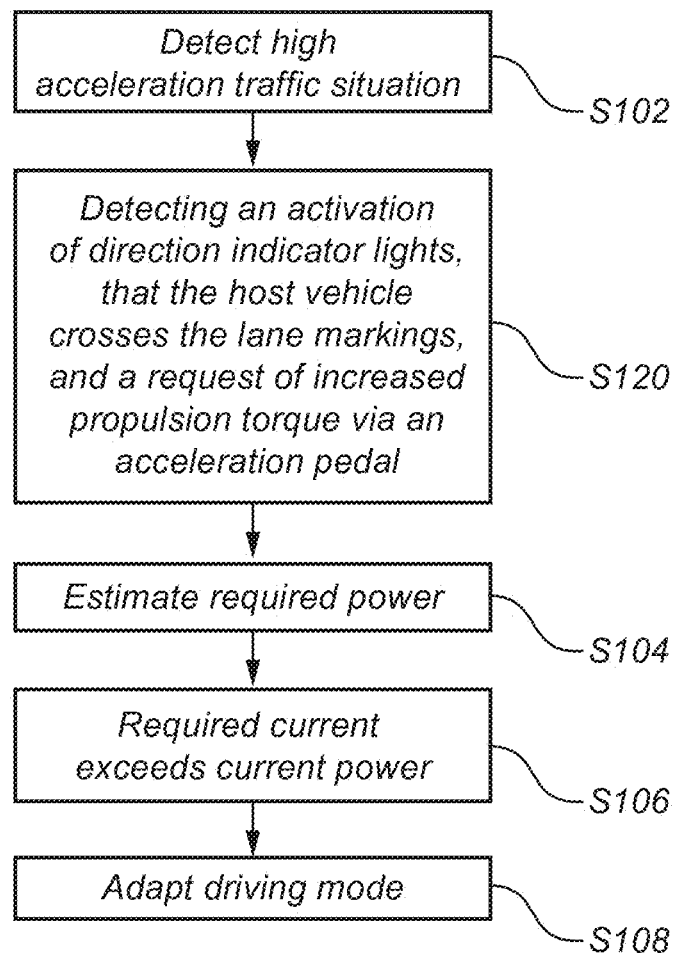
FIG. 5 is a flow-chart of method steps to adapt a driving mode of a vehicle according to an example.

FIG. 5 is a flow-chart of method steps to adapt a driving mode 124 of a host vehicle 104 according to an example.

In step S102, detecting, by a ECU 103 of a computer system 100, using sensors 103 of a host vehicle 104, a high acceleration traffic situation 104 involving a secondary vehicle 110.

In step S120, detecting, by the ECU 103, an activation of direction indicator lights 162, that the host vehicle 104 crosses the lane markings 168, and a request of increased propulsion torque via an acceleration pedal 174, while at the same time the presence of a secondary vehicle 178 in front of the host vehicle 104 and a secondary vehicle 110 in the blind spot 184 are detected using the sensors 103 of the host vehicle 104.

In step S104, estimating, by the ECU 103, a required power 112 to handle the high acceleration traffic situation 104 clear of the secondary vehicles 110 and 178 within a timeframe 111.

In step S106, determining, by the ECU 103, the required power 112 exceeds a current power 116 available in an activated ECO mode 120 of the host vehicle 104.

In step S108, adapting, by the ECU 103, a driving mode 124 of the host vehicle 104 from the ECO mode 120 to a higher power mode 126 providing higher propulsion power than in the ECO mode 120.

Figure 6:
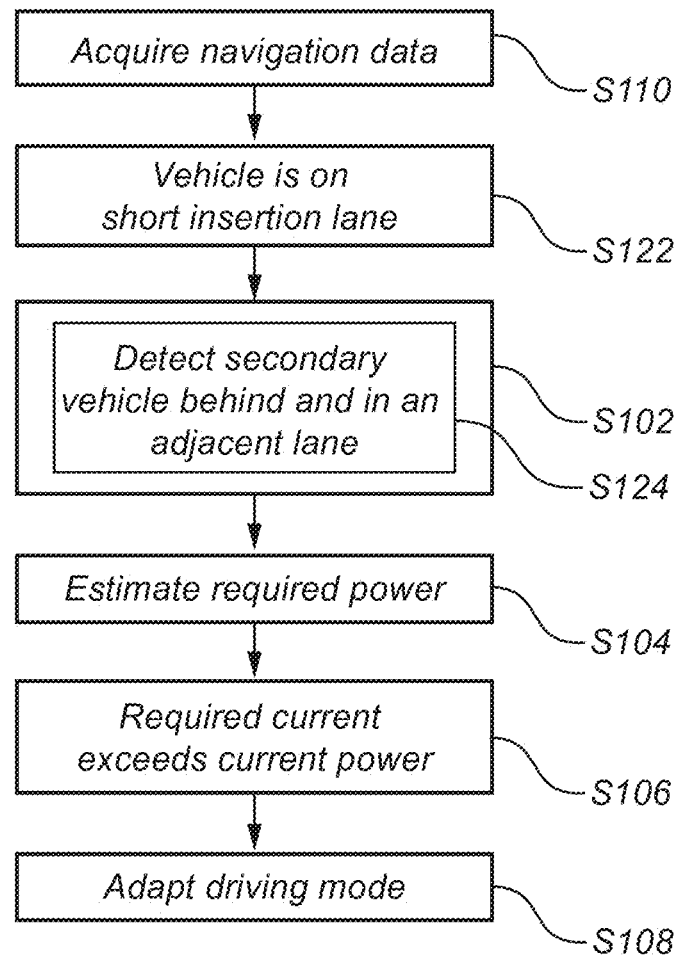
FIG. 6 is a flow-chart of method steps to adapt a driving mode of a vehicle according to an example.

FIG. 6 is a flow-chart of method steps to adapt a driving mode 124 of a host vehicle 104 according to an example.

In step S110, acquiring, by the ECU 103, navigational data 128.

In step S122, determining, by the ECU 103, from the navigational data 128, that the host vehicle 104 is on an insertion lane 186 with length L, lower than a predetermined length threshold 190. That is, the insertion lane 186 is considered short and rapid acceleration may be required to safely enter the adjacent lane 194.

In step S124 detecting, by the ECU 103, that the secondary vehicle 110 is in the adjacent lane 194 and behind the host vehicle 104 and closer to the host vehicle 104 than a predetermined proximity threshold 198. That is, the secondary vehicle 110 is considered close and rapid acceleration may be required to safely enter the adjacent lane 186. The detection step S124 is a more specific detection, but still part of step S102 which involves detecting secondary vehicles 110. Thus, it may firstly be detected that the host vehicle 104 is on the short insertion lane 186 based on the navigational data 128 in steps S110 and S122. Next detection of the secondary vehicle 110 in steps S124, S102 is performed.

In step S104, estimating, by the ECU 103, a required power to handle the high acceleration traffic situation 106 clear of the secondary vehicle 110 within a timeframe 111.

In step S106, determining, by the ECU 103, the required power 112 exceeds a current power 116 available in an activated ECO mode 120 of the host vehicle 104.

In step S108, in response, adapting, by the ECU 103, the driving mode 124 of the host vehicle 104.

Figure 7:
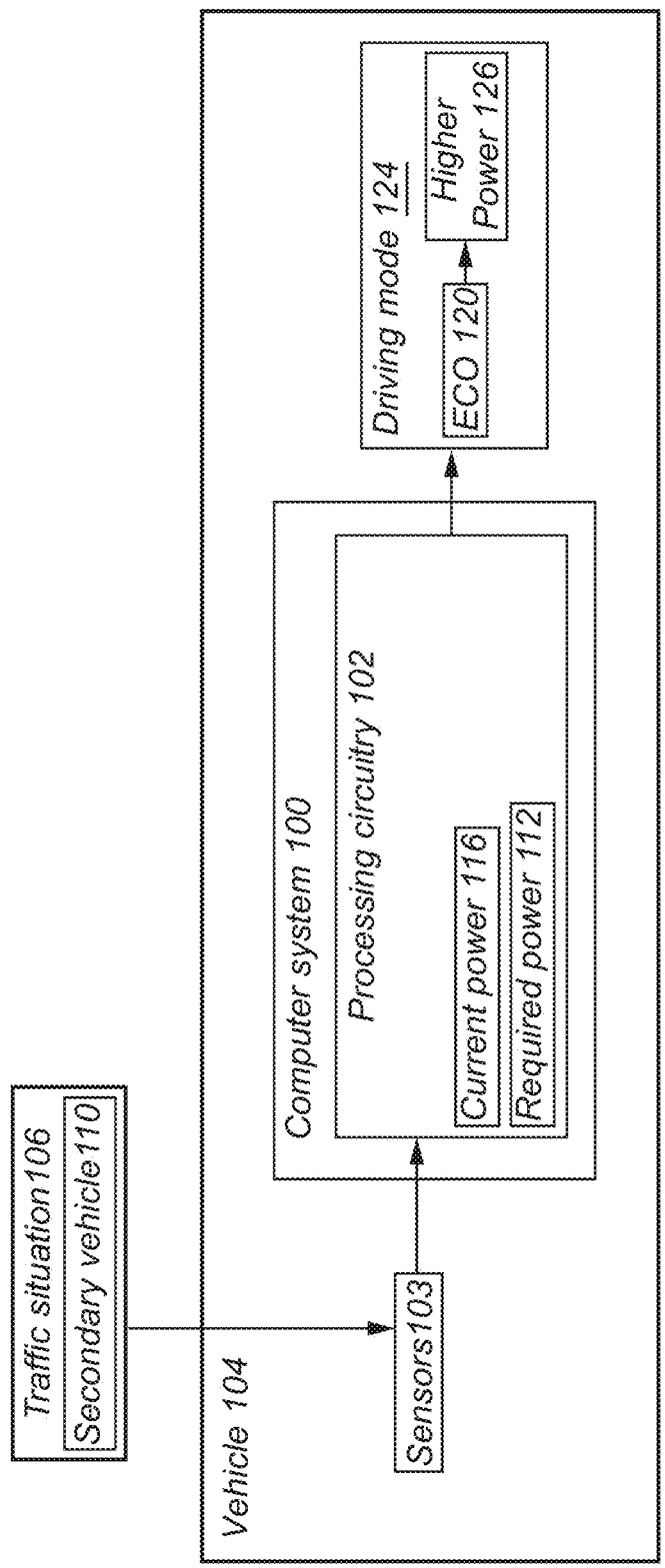
FIG. 7 is another view of FIG. 1, according to an example.

FIG. 7 is another view of FIG. 1, according to an example. FIG. 7 is an example system diagram of a computer system 100 comprising processing circuitry 102 configured to: detect, using sensors 103 of a host vehicle 104, a high acceleration traffic situation 106 involving a secondary vehicle 110, estimate a required power 112 to handle the high acceleration traffic situation 106 clear of the secondary vehicle 110 within a timeframe, determine the required power 112 exceeds a current power 116 available in an activated ECO mode 120 of the vehicle, adapt a driving mode 124 of the vehicle from the ECO to a higher power mode 126 providing higher propulsion power than in the ECO mode.

Figure 8:
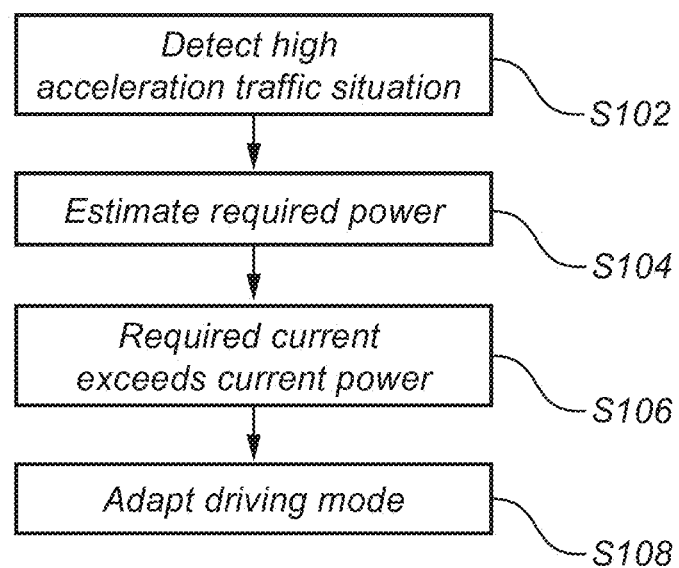
FIG. 8 is a flow chart of a method to adapt a driving mode of a vehicle according to an example.

FIG. 8 is a flow chart of a method to adapt a driving mode of a vehicle according to an example. The method comprises detecting, in step S102, by a processing circuitry of a computer system, using sensors of a host vehicle, a high acceleration traffic situation involving a secondary vehicle, estimating, in step S104, by the processing circuitry, a required power to handle the high acceleration traffic situation clear of the secondary vehicle within a timeframe, determining, in step S106, by the processing circuitry, the required power exceeds a current power available in an activated ECO mode of the vehicle, adapting, in step S108, by the processing circuitry, a driving mode of the vehicle from the ECO mode to a higher power mode providing higher propulsion power than in the ECO mode.

Figure 9:
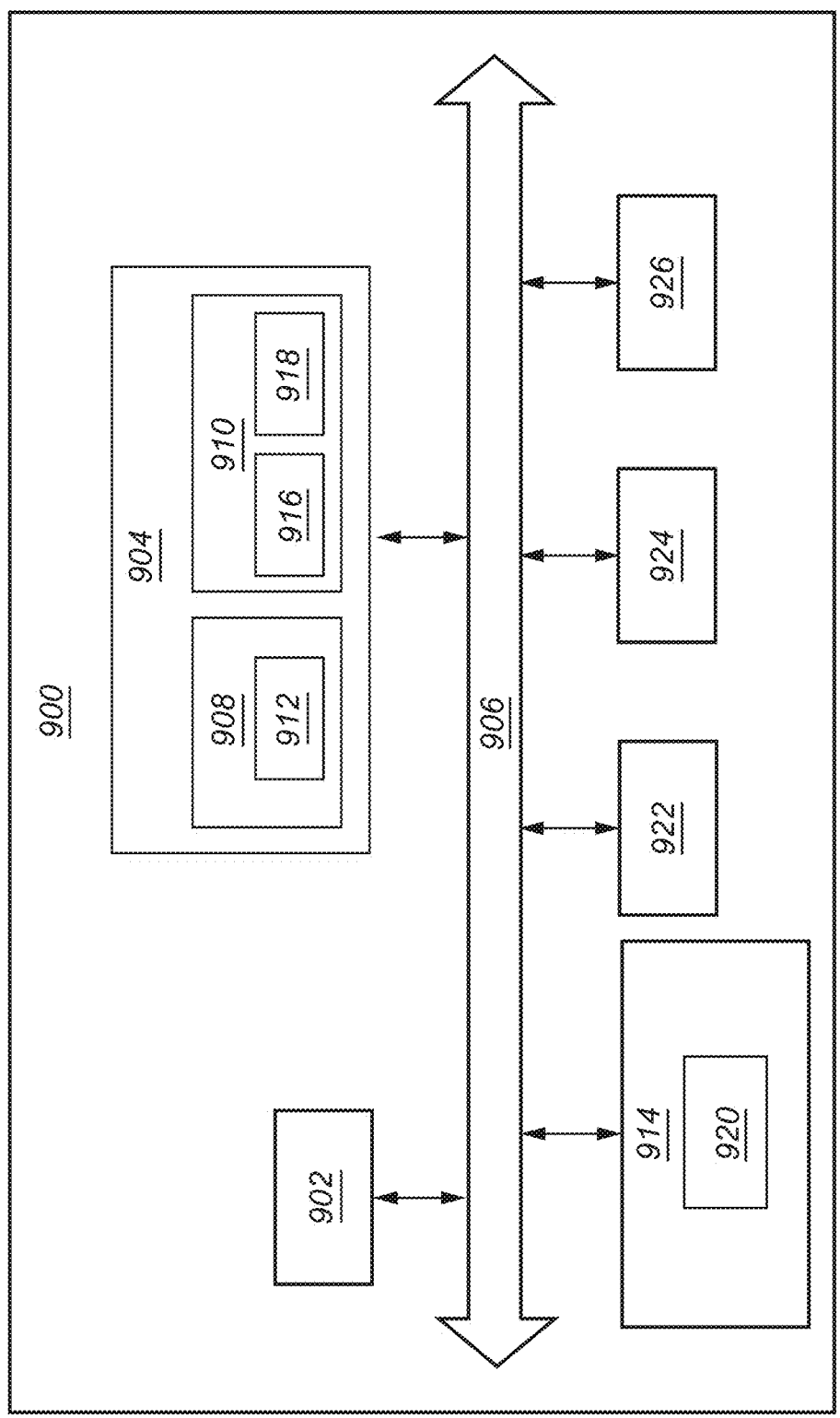
FIG. 9 is a schematic diagram of an exemplary computer system for implementing examples disclosed herein, according to an example.

FIG. 9 is a schematic diagram of a computer system 900 for implementing examples disclosed herein. The computer system 900 is adapted to execute instructions from a computer-readable medium to perform these and/or any of the functions or processing described herein. The computer system 900 may be connected (e.g., networked) to other machines in a LAN (Local Area Network), LIN (Local Interconnect Network), automotive network communication protocol (e.g., FlexRay), an intranet, an extranet, or the Internet. While only a single device is illustrated, the computer system 900 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 900 may comprise at least one computing device or electronic device capable of including firmware, hardware, and/or executing software instructions to implement the functionality described herein. The computer system 900 may include processing circuitry 902 (e.g., processing circuitry including one or more processor devices or control units), a memory 904, and a system bus 906. The computer system 900 may include at least one computing device having the processing circuitry 902. The system bus 906 provides an interface for system components including, but not limited to, the memory 904 and the processing circuitry 902. The processing circuitry 902 may include any number of hardware components for conducting data or signal processing or for executing computer code stored in memory 904. The processing circuitry 902 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 902 may further include computer executable code that controls operation of the programmable device.

The system bus 906 may be any of several types of bus structures that may further interconnect to a memory bus (with or without a memory controller), a peripheral bus, and/or a local bus using any of a variety of bus architectures. The memory 904 may be one or more devices for storing data and/or computer code for completing or facilitating methods described herein. The memory 904 may include database components, object code components, script components, or other types of information structure for supporting the various activities herein. Any distributed or local memory device may be utilized with the systems and methods of this description. The memory 904 may be communicably connected to the processing circuitry 902 (e.g., via a circuit or any other wired, wireless, or network connection) and may include computer code for executing one or more processes described herein. The memory 904 may include non-volatile memory 908 (e.g., read-only memory (ROM), erasable programmable read-only memory (EPROM), electrically erasable programmable read-only memory (EEPROM), etc.), and volatile memory 910 (e.g., random-access memory (RAM)), or any other medium which can be used to carry or store desired program code in the form of machine-executable instructions or data structures and which can be accessed by a computer or other machine with processing circuitry 902. A basic input/output system (BIOS) 912 may be stored in the non-volatile memory 908 and can include the basic routines that help to transfer information between elements within the computer system 900.

The computer system 900 may further include or be coupled to a non-transitory computer-readable storage medium such as the storage device 914, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 914 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 914 and/or in the volatile memory 910, which may include an operating system 916 and/or one or more program modules 918. All or a portion of the examples disclosed herein may be implemented as a computer program 920 stored on a transitory or non-transitory computer-usable or computer-readable storage medium (e.g., single medium or multiple media), such as the storage device 914, which includes complex programming instructions (e.g., complex computer-readable program code) to cause the processing circuitry 902 to carry out actions described herein. Thus, the computer-readable program code of the computer program 920 can comprise software instructions for implementing the functionality of the examples described herein when executed by the processing circuitry 902. In some examples, the storage device 914 may be a computer program product (e.g., readable storage medium) storing the computer program 920 thereon, where at least a portion of a computer program 920 may be loadable (e.g., into a processor) for implementing the functionality of the examples described herein when executed by the processing circuitry 902. The processing circuitry 902 may serve as a controller or control system for the computer system 900 that is to implement the functionality described herein.

The computer system 900 may include an input device interface 922 configured to receive input and selections to be communicated to the computer system 900 when executing instructions, such as from a keyboard, mouse, touch-sensitive surface, etc. Such input devices may be connected to the processing circuitry 902 through the input device interface 922 coupled to the system bus 906 but can be connected through other interfaces, such as a parallel port, an Institute of Electrical and Electronic Engineers (IEEE) 1394 serial port, a Universal Serial Bus (USB) port, an IR interface, and the like. The computer system 900 may include an output device interface 924 configured to forward output, such as to a display, a video display unit (e.g., a liquid crystal display (LCD) or a cathode ray tube (CRT)). The computer system 900 may include a communications interface 926 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Example 1: A computer system comprising processing circuitry configured to: detect, using sensors of a host vehicle, a high acceleration traffic situation involving a secondary vehicle, estimate a required power to handle the high acceleration traffic situation clear of the secondary vehicle within a timeframe, determine the required power exceeds a current power available in an activated ECO mode of the vehicle, adapt a driving mode of the vehicle from the ECO mode to a higher power mode providing higher propulsion power than in the ECO mode.

Example 2: The computer system of example 1, wherein the processing circuitry is further configured to: acquire navigation data, determine that the host vehicle is at or near a road section that requires the higher power mode, and adapt the driving mode of the vehicle from the ECO mode to the higher power mode prior to reaching the road section.

Example 3: The computer system of example 2, wherein the road section is determined to require the higher power mode based on prior collected data indicating that the road section has historically required the higher power mode, or based on road characteristics extractable from the navigational data.

Example 4: The computer system of any of examples 1-3, wherein the processing circuitry is further configured to: transmit navigation data that indicates a road section that required adapting to the higher power mode to other vehicles or to a server.

Example 5: The computer system of any of examples 1-4, wherein the processing circuitry is further configured to: maintain the higher power mode until the vehicle has handled the high acceleration traffic situation.

Example 6: The computer system of any of examples 1-5, wherein adapting the driving mode from the ECO mode to the higher power mode includes adapting at least one of acceleration limit, speed limit, and gear shifting strategy.

Example 7: The computer system of example 1, wherein the processing circuitry is further configured to: detect an activation of direction indicator lights, that the host vehicle crosses the lane markings, and a request of increased propulsion torque via an acceleration pedal, while at the same the presence of a secondary vehicle in front of the vehicle and a secondary vehicle in the blind spot are detected using the sensors of the host vehicle, and in response, adapt the driving mode of the vehicle.

Example 8: The computer system of example 1, wherein the processing circuitry is further configured to: acquire navigational data, determine, from the navigational data, that the vehicle is on an insertion lane with length lower than a predetermined threshold, detect that the secondary vehicle is in the adjacent lane and behind the host vehicle and closer to the host vehicle than a predetermined proximity threshold, in response, adapt the driving mode of the vehicle.

Example 9: A vehicle comprising the computer system of any of examples 1-8.

Example 10: A computer-implemented method, comprising: detecting, by a processing circuitry of a computer system, using sensors of a host vehicle, a high acceleration traffic situation involving a secondary vehicle, estimating, by the processing circuitry, a required power to handle the high acceleration traffic situation clear of the secondary vehicle within a timeframe, determining, by the processing circuitry, the required power exceeds a current power available in an activated ECO mode of the vehicle, adapting, by the processing circuitry, a driving mode of the vehicle from the ECO mode to a higher power mode providing higher propulsion power than in the ECO mode.

Example 11: The method of example 10, further comprising: acquiring, by the processing circuitry, navigation data, determining, by the processing circuitry, that the host vehicle is at or near a road section that requires the higher power mode, and adapting, by the processing circuitry, the driving mode of the vehicle from the ECO mode to the higher power mode prior to reaching the road section.

Example 12: The method of example 11, wherein a road section is determined to require the higher power mode based on prior collected data indicating that the road section has historically required the power mode, or based on road characteristics extractable from the navigational data.

Example 13: The method of any of examples 10-12, further comprising: transmitting, by the processing circuitry, navigation data that indicates a road section that required adapting to the power mode to other vehicles or to a server.

Example 14: The method of any of examples 10-13, further comprising: maintaining, by the processing circuitry, the higher power mode until the vehicle has handled the high acceleration traffic situation.

Example 15: The method of any of examples, wherein adapting the driving mode from the ECO mode to the higher power mode includes adapting at least one of acceleration limit, speed limit, and gear shifting strategy.

Example 16: The method of any of examples 10-16, further comprising: providing, by the processing circuitry, a message on a user interface in the vehicle that ECO is temporarily deactivated.

Example 17: The method of example 10, further comprising: detecting, by the processing circuitry, an activation of direction indicator lights, that the host vehicle crosses the lane markings, and a request of increased propulsion torque via an acceleration pedal, while at the same the presence of a secondary vehicle in front of the vehicle and a secondary vehicle in the blind spot are detected using the sensors of the host vehicle, and in response, adapting, by the processing circuitry, the driving mode of the vehicle.

Example 18: The method of example 10, further comprising: acquiring, by the processing circuitry, navigational data, determining, by the processing circuitry, from the navigational data, that the vehicle is on an insertion lane with length lower than a predetermined threshold, detecting, by the processing circuitry, that the secondary vehicle is in the adjacent lane and behind the host vehicle and closer to the host vehicle than a predetermined proximity threshold, in response, adapting, by the processing circuitry, the driving mode of the vehicle.

Example 19: A computer program product comprising program code for performing, when executed by the processing circuitry, the method of any of examples 10-18.

Example 20: A non-transitory computer-readable storage medium comprising instructions, which when executed by the processing circuitry, cause the processing circuitry to perform the method of any of examples 10-18.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system comprising processing circuitry configured to:
   detect, using sensors of a host vehicle, a high acceleration traffic situation involving a secondary vehicle;
   estimate a required power to handle the high acceleration traffic situation clear of the secondary vehicle within a timeframe;
   determine the required power exceeds a current power available in an activated ECO mode of the host vehicle; and
   adapt a driving mode of the host vehicle from the ECO mode to a higher power mode providing higher propulsion power than in the ECO mode.

2. The computer system of claim 1, wherein the processing circuitry is further configured to:
   acquire navigation data;
   determine that the host vehicle is at or near a road section that requires the higher power mode; and
   adapt the driving mode of the host vehicle from the ECO mode to the higher power mode prior to reaching the road section.

3. The computer system of claim 2, wherein the road section is determined to require the higher power mode based on prior collected data indicating that the road section has historically required the higher power mode, or based on road characteristics extractable from the navigation data.

4. The computer system of claim 1, wherein the processing circuitry is further configured to:
   transmit navigation data that indicates a road section that required adapting to the higher power mode to other vehicles or to a server.

5. The computer system of claim 1, wherein the processing circuitry is further configured to:
   maintain the higher power mode until the host vehicle has handled the high acceleration traffic situation.

6. The computer system of claim 1, wherein adapting the driving mode from the ECO mode to the higher power mode includes adapting at least one of acceleration limit, speed limit, and gear shifting strategy.

7. The computer system of claim 1, wherein the processing circuitry is further configured to:
   detect an activation of direction indicator lights, that the host vehicle crosses lane markings, and a request of increased propulsion torque via an acceleration pedal, while at the same time a presence of a first secondary vehicle in front of the host vehicle and a second secondary vehicle in a blind spot are detected using the sensors of the host vehicle; and
   in response, adapt the driving mode of the host vehicle.

8. The computer system of claim 1, wherein the processing circuitry is further configured to:
   acquire navigation data;
   determine, from the navigation data, that the host vehicle is on an insertion lane with length lower than a predetermined threshold;
   detect that the secondary vehicle is in an adjacent lane and behind the host vehicle and closer to the host vehicle than a predetermined proximity threshold; and
   in response, adapt the driving mode of the host vehicle.

9. A vehicle comprising the computer system of claim 1.

10. A computer-implemented method, comprising:
    detecting, by a processing circuitry of a computer system, using sensors of a host vehicle, a high acceleration traffic situation involving a secondary vehicle;
    estimating, by the processing circuitry, a required power to handle the high acceleration traffic situation clear of the secondary vehicle within a timeframe;
    determining, by the processing circuitry, the required power exceeds a current power available in an activated ECO mode of the host vehicle; and
    adapting, by the processing circuitry, a driving mode of the host vehicle from the ECO mode to a higher power mode providing higher propulsion power than in the ECO mode.

11. The method of claim 10, further comprising:
    acquiring, by the processing circuitry, navigation data;
    determining, by the processing circuitry, that the host vehicle is at or near a road section that requires the higher power mode; and
    adapting, by the processing circuitry, the driving mode of the host vehicle from the ECO mode to the higher power mode prior to reaching the road section.

12. The method of claim 11, wherein the road section is determined to require the higher power mode based on prior collected data indicating that the road section has historically required the higher power mode, or based on road characteristics extractable from the navigation data.

13. The method of claim 10, further comprising:
    transmitting, by the processing circuitry, navigation data that indicates a road section that required adapting to the higher power mode to other vehicles or to a server.

14. The method of claim 10, further comprising:
    maintaining, by the processing circuitry, the higher power mode until the host vehicle has handled the high acceleration traffic situation.

15. The method of claim 10, wherein adapting the driving mode from the ECO mode to the higher power mode includes adapting at least one of acceleration limit, speed limit, and gear shifting strategy.

16. The method of claim 10, further comprising:
    providing, by the processing circuitry, a message on a user interface in the host vehicle that the ECO mode is temporarily deactivated.

17. The method of claim 10, further comprising:
    detecting, by the processing circuitry, an activation of direction indicator lights, that the host vehicle crosses lane markings, and a request of increased propulsion torque via an acceleration pedal, while at the same time a presence of a first secondary vehicle in front of the host vehicle and a second secondary vehicle in a blind spot are detected using the sensors of the host vehicle; and in response, adapting, by the processing circuitry, the driving mode of the host vehicle.

18. The method of claim 10, further comprising:

acquiring, by the processing circuitry, navigation data;

determining, by the processing circuitry, from the navigation data, that the host vehicle is on an insertion lane with length lower than a predetermined threshold;

detecting, by the processing circuitry, that the secondary vehicle is in an adjacent lane and behind the host vehicle and closer to the host vehicle than a predetermined proximity threshold; and in response, adapting, by the processing circuitry, the driving mode of the host vehicle.

19. A computer program product comprising program code for performing, when executed by the processing circuitry, the method of claim 10.

20. A non-transitory computer-readable storage medium comprising instructions, which when executed by the processing circuitry, cause the processing circuitry to perform the method of claim 10.

* * * * *